US007302546B2

(12) United States Patent
Hsu et al.

(10) Patent No.: US 7,302,546 B2
(45) Date of Patent: Nov. 27, 2007

(54) METHOD, SYSTEM, AND ARTICLE OF MANUFACTURE FOR RESERVING MEMORY

(75) Inventors: Yu-Cheng Hsu, Tucson, AZ (US); John Norbert McCauley, Tucson, AZ (US); Cheng-Chung Song, Tucson, AZ (US); William Griswold Sherman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 10/754,139

(22) Filed: Jan. 9, 2004

(65) Prior Publication Data

US 2005/0154854 A1     Jul. 14, 2005

(51) Int. Cl.
    *G06F 12/00* (2006.01)
(52) U.S. Cl. .............................. 711/203; 711/1; 711/6; 713/1; 713/2
(58) Field of Classification Search ............ 711/6, 711/202, 203, 209, 1, 170, 104, 165; 713/1, 713/2
    See application file for complete search history.

(56) References Cited

U.S. PATENT DOCUMENTS

| | | | |
|---|---|---|---|
| 5,628,023 A * | 5/1997 | Bryant et al. ............... | 711/207 |
| 5,659,798 A * | 8/1997 | Blumrich et al. ............ | 710/26 |
| 5,860,147 A | 1/1999 | Gochman et al. | |
| 6,226,725 B1 | 5/2001 | Yarborough | |
| 6,304,951 B1 | 10/2001 | Mealey et al. | |
| 6,421,761 B1 | 7/2002 | Arimilli et al. | |
| 6,430,656 B1 | 8/2002 | Arimilli et al. | |
| 6,658,522 B1 * | 12/2003 | Martin et al. ................. | 711/1 |
| 6,772,330 B2 * | 8/2004 | Merkin ........................ | 713/2 |
| 6,804,766 B1 * | 10/2004 | Noel et al. ................... | 711/203 |
| 6,965,989 B1 * | 11/2005 | Strange et al. ................ | 713/1 |
| 2002/0078308 A1 | 6/2002 | Altman et al. | |
| 2002/0091863 A1 | 7/2002 | Schlug | |

(Continued)

OTHER PUBLICATIONS

U.S. Appl. No. 09/619,053, entitled "Mechanisms for Efficient Message Passing with Copy Avoidance in a Distributed System", filed Jul. 18, 2000, by inventors G. Shah, R. Blackmore, K. Gildea, Dr. Govindaraju, C. Kim.

(Continued)

*Primary Examiner*—Sanjiv Shah
*Assistant Examiner*—Yaima Campos
(74) *Attorney, Agent, or Firm*—Konrad Raynes & Victor LLP; Rabindranath Dutta

(57) ABSTRACT

Provided are a method, system, and article of manufacture, wherein in certain embodiments, a plurality of logical memory blocks corresponding to a memory in a computational device are allocated. An attribute is associated with at least one logical memory block, wherein the attribute indicates whether the at least one logical memory block can be swapped from the memory, and wherein physical blocks corresponding to the at least one logical memory block are contiguous.

24 Claims, 7 Drawing Sheets

U.S. PATENT DOCUMENTS

| | | |
|---|---|---|
| 2002/0099876 A1* | 7/2002 | Bui et al. .................. 710/4 |
| 2002/0133676 A1 | 9/2002 | Oldfield et al. |
| 2002/0169938 A1 | 11/2002 | Scott et al. |
| 2002/0172199 A1 | 11/2002 | Scott et al. |
| 2003/0046505 A1 | 3/2003 | Craddock et al. |
| 2003/0101324 A1 | 5/2003 | Herr et al. |
| 2003/0149683 A1* | 8/2003 | Lee et al. .................. 707/1 |
| 2004/0054866 A1* | 3/2004 | Blumenau et al. ......... 711/202 |
| 2005/0144402 A1* | 6/2005 | Beverly .................. 711/152 |

OTHER PUBLICATIONS

U.S. Appl. No. 10/268,474, entitled "Method and Profiling Cache for Management of Virtual Memory", filed Oct. 10, 2002, by inventors K. Bottemiller, b. Jacobs, J. Peiterick.

U.S. Appl. No. 10/261,866, entitled "Virtual Mode Virtual Memory Manager method and Apparatus", filed Sep. 30, 2002, by inventors R. Swanberg, M. Rogers.

* cited by examiner

METHOD, SYSTEM, AND ARTICLE OF MANUFACTURE FOR RESERVING MEMORY

BACKGROUND

1. Field

The present invention relates to a method, system, and an article of manufacture for reserving memory.

2. Description of the Related Art

In many computational devices, the storage capacity of secondary storage, such as, disk storage, may be larger than the storage capacity of main memory, such as, random access memory. In certain implementations, a virtual memory manager may implement a virtual memory, such that, the addressable storage space available to an application in a computational device is not limited by the storage capacity of the main memory in the computational device. The virtual memory manager may implement the virtual memory by using the secondary storage to simulate additional main memory.

In implementations of virtual memory, the virtual memory manager may swap data and instructions from the main memory to the secondary storage in order to accommodate data and instructions that need to be stored in the main memory. In certain implementations, data and instructions may be stored in data structures referred to as pages, and the virtual memory manager may swap pages from the main memory to the secondary storage as required.

Operating systems may allow a certain amount of memory to be reserved in the main memory, such that, the reserved memory is not swapped from the main memory to the secondary storage. Certain types of reserved memory may be referred to as pinned memory or hidden memory. Instructions and data stored in the main memory may be accessed faster than instructions and data stored in the secondary storage. In certain implementations, such as, implementations involving real-time applications, such reservation of memory may be needed for real-time execution of instructions. In certain implementations, such real time applications may execute in an Enterprise Storage Server* (ESS) system. In certain implementations, other applications besides real-time applications may also reserve part of the main memory.

*AIX, Enterprise Storage Server (ESS) are trademarks of International Business Machines Corp.

Certain operating systems may place an upper limit on the total amount of main memory that may be reserved. For example, in many versions of the UNIX* operating system, such as, the AIX* operating system, the total amount of main memory that may be reserved may not exceed 80% of the total main memory.

*UNIX is a trademark of the Open Group.

SUMMARY OF THE PREFERRED EMBODIMENTS

Provided are a method, system, and article of manufacture, wherein in certain embodiments, a plurality of logical memory blocks corresponding to a memory in a computational device are allocated. An attribute is associated with at least one logical memory block, wherein the attribute indicates whether the at least one logical memory block can be swapped from the memory, and wherein physical blocks corresponding to the at least one logical memory block are contiguous.

In additional embodiments, allocating the plurality of logical memory blocks and associating the attribute further comprise: (a) determining if a firmware in the computational device possesses information on which of the plurality of logical memory blocks to configure into reserved logical memory blocks; and (b) setting the attribute associated with the at least one logical memory block based on the possessed information, in response to determining that the firmware in the computational device possesses information on which of the plurality of logical memory blocks to configure into reserved logical memory blocks, wherein the attribute if set indicates that the at least one logical memory block cannot be swapped from the memory and that the at least one logical memory block is a reserved logical memory block.

In yet further embodiments, allocating the plurality of logical memory blocks and associating the attribute further comprise: (a) determining if a firmware in the computational device possesses information on which of the plurality of logical memory blocks to configure into reserved logical memory blocks; (b) determining, by the firmware, in association with a memory reservation application which of the plurality of logical memory blocks to configure into reserved logical memory blocks, in response to determining that the firmware in the computational device does not possesses information on which of the plurality of logical memory blocks to configure into reserved logical memory blocks; and (c) saving, by the firmware, which of the plurality of logical memory blocks to configure into reserved memory blocks across initial program loads of the computational device.

In additional embodiments, an additional attribute is associated with the at least one logical memory block, wherein the additional attribute further characterizes properties of the at least one logical memory block.

In yet further embodiments, an additional attribute is associated with the at least one logical memory block, wherein the additional attribute indicates whether data in the at least one logical memory block is modifiable.

In still further embodiments, a virtual memory manager executes an instruction to swap the at least one logical memory block to a secondary storage coupled to the computational device. The virtual memory manager determines whether the associated attribute of the at least one logical memory block indicates that the logical memory block cannot be swapped from the memory. The at least one logical memory block is swapped to the secondary storage from the memory, in response to determining that the associated attribute of the at least one logical memory block does not indicate that the logical memory block cannot be swapped from the memory.

In further embodiments, a first memory management policy is maintained for reserved logical memory blocks. A second memory management policy is maintained for unreserved logical memory blocks. A determination is made as to whether the at least one memory block is a reserved logical memory block. A memory management operation is performed on the at least one logical memory block based on the first memory management policy, in response to determining that the at least one memory block is a reserved logical memory block.

In yet further embodiments, allocating the plurality of logical memory blocks and associating the attribute are performed by a firmware in the computational device, wherein the computational device includes an operating system that has a limit on an amount of memory that can be reserved for swapping from the memory, and wherein allocating the plurality of logical memory blocks and associating the attribute allow an application to exceed the limit on the amount of memory that can be reserved.

In still further embodiments, allocating the plurality of logical memory blocks and associating the attribute are performed by an application in the computational device, and wherein the application is different from an operating system in the computational device.

In yet additional embodiments, a static address translation is performed for the at least one logical memory block, if the at least one logical memory block cannot be swapped from the memory.

Certain embodiments provide an attribute for each logical memory block to indicate that the logical memory block is reserved and may not be allowed to be paged into secondary storage from main memory. An operating system may divide the memory into a regular pool and a reserved pool, where the regular pool corresponds to memory that is not reserved and the reserved pool corresponds to memory that is reserved. The virtual memory manager of the operating system may provide address translation for both the regular pool and the reserved pool. However, the virtual memory manager may page only the memory from the regular pool to the secondary storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the present embodiments.

Figure 1:
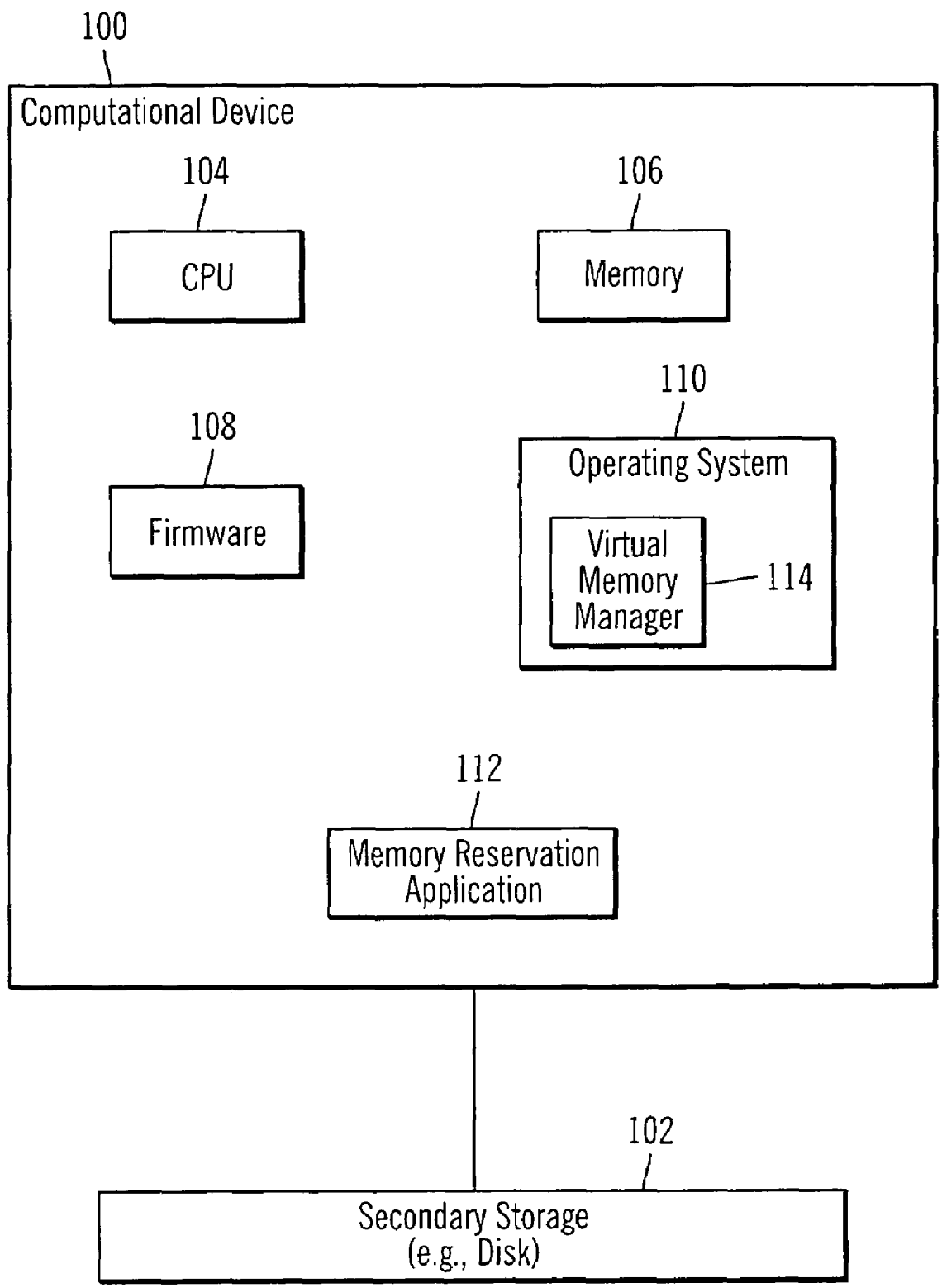
FIG. 1 illustrates a block diagram of a computing environment, in accordance with certain described embodiments of the invention.

FIG. 1 illustrates a block diagram of a computing environment, in accordance with certain embodiments of the invention. A computational device 100 is shown coupled to a secondary storage 102. Although the secondary storage 102 is shown external to the computational device 100, in certain embodiments the secondary storage 102 may be internal to the computational device 100. In additional embodiments, additional computational devices (not shown), such as, a host system that performs Input/Output (I/O) operations with respect to the computational device 100 may be implemented.

The computational device 100 may include a personal computer, a workstation, a server, a mainframe, a hand held computer, a palm top computer, a telephony device, a network appliance, a blade computer, a storage controller, etc. The secondary storage 102 may include a direct access storage device, such as, a disk, a tape, a Read/Write DVD, a Read/Write CDROM, a Redundant Array of Independent Disks (RAID), Just a Bunch of Disks (JBOD), etc., or any other storage device. The computational device 100 and the secondary storage 102 may be coupled by a network (not shown), such as the Internet, an intranet, a Local area network (LAN), a Storage area network (SAN), a Wide area network (WAN), a wireless network, etc. The computational device 100 and the secondary storage 102 may alternatively be coupled without a network, such as through direct lines, common bus systems, etc.

The computational device 100 may include a central processing unit (CPU) 104, a memory 106, a firmware 108, an operating system 110 and a memory reservation application 112.

The CPU 104 may comprise a complex instruction set computing (CISC) processor, a reduced instruction set computing (RISC) processor, or any other processor. While only a single CPU 104 is shown, in certain embodiments the computational device 100 may include additional CPUs to form a multiprocessing system.

The memory 106 may comprise a random access memory (RAM). The memory 106 may also be referred to as physical memory. In certain embodiments, the memory 106 may be included in chips coupled to a bus in the computational device 100. The memory 106 may be volatile, which means that the memory 106 may require a steady flow of electricity to maintain the contents of the memory 106. In response to power being turned off, data that may have been present in the memory 106 may be lost. Instructions loaded in the memory 106 may be executed in the CPU 104. The instructions loaded in the memory 106 may access data that is present in the memory 106, at a time the instructions execute in the CPU 104. The amount of memory 106 may be smaller than the amount of secondary storage 102.

The firmware 108 may include programs or data that may have been written onto read-only memory (ROM), programmable read only memory (PROM), erasable programmable read-only memory (EPROM), etc. The firmware 108 may be a combination of hardware and software.

The operating system 110 may be software that controls the execution of system and application programs that execute in the computational device 100. The operating system 110 may provide various services to the system and application programs that execute in the computational device 100. In certain embodiments, the operating system 110 may include the UNIX operating system, the AIX operating system, or some other operating system. The operating system 110 may include a virtual memory manager 114, where the virtual memory manager 114 may swap data from the memory 106 to the secondary storage 102. For example, if new instructions or data have to be accommodated into the memory 106 when the memory 106 is full, the virtual memory manger 114 may swap certain pages from the memory 106 to the secondary storage 102.

The memory reservation application 112 is an application implemented in the computational device 100. The memory reservation application 112 may determine which logical memory blocks in the memory 106 are to be configured as reserved memory. The memory reservation application 112 may be implemented in software, hardware or firmware. In certain embodiments, the memory reservation application 112 may function in association with the firmware 108 to implement reserved memory in the memory 106.

Therefore, FIG. 1 illustrates certain embodiments in which the memory reservation application 112 in association with the firmware 108 may reserve a certain amount of the memory 106, such that the reserved memory may not be swapped into the secondary storage 102 by the virtual memory manager 114.

Figure 2:
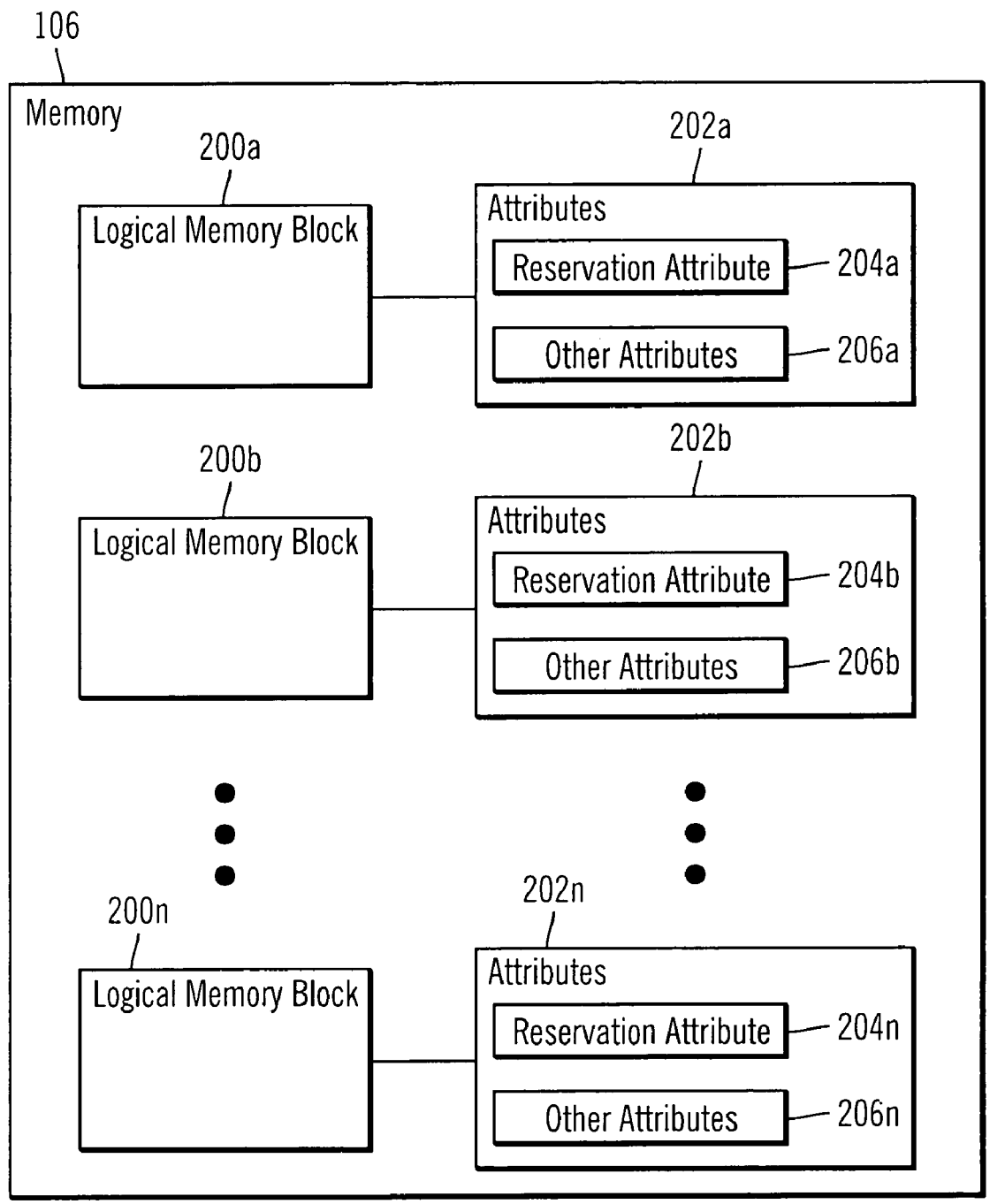
FIG. 2 illustrates a block diagram of data structures implemented in the computing environment, in accordance with certain described embodiments of the invention.

FIG. 2 illustrates a block diagram of data structures implemented in the computational device 100, in accordance with certain embodiments of the invention.

The memory 106 may be represented by a plurality of logical memory blocks 200a ... 200n. Additional logical memory blocks besides the logical memory blocks 200a ... 200n may reside in the secondary storage 102. The logical memory blocks 200a ... 200n that reside in the memory 106 and the logical memory blocks residing in the secondary storage 102 may together form the virtual address space of applications that execute in the computational device 100. A logical memory block, such as, logical memory block 200a, may include a number of bytes of memory.

Associated with the plurality of logical memory blocks 200a ... 200n are a plurality of attributes 202a ... 202n. For example, attributes 202a are associated with logical memory block 200a, attributes 202b are associated with logical memory blocks 200b, and attributes 202n are associated with logical memory blocks 202n. In certain embodiments, an attribute may define one or more properties of a memory block. For example, an attribute may indicate whether a memory block is a reserved memory block, i.e., the memory block cannot be swapped from the memory 106. In certain embodiments, logical memory blocks that are included in the secondary storage 102 may also include attributes similar to attributes 202a ... 202n. In certain embodiments, if logical memory blocks are swapped from the memory 106 to the secondary storage 102 the corresponding attributes may also be swapped to the secondary storage.

In FIG. 2, the attributes 202a ... 202n are shown external to the logical memory block. However, in certain embodiments the attributes 202a ... 202n may be implemented as part of the logical memory blocks 200a ... 200n.

In certain embodiments, the attributes 202a ... 202n may include reservation attributes 204a ... 204n and one or more other attributes 206a ... 206n. For example, attributes 202a may include the reservation attribute 204a and the other attributes 206a, attributes 202b may include the reservation attribute 204b and the other attributes 206b, and attributes 202n may include the reservation attribute 204n and the other attributes 206n.

The reservation attributes 204a ... 204n may indicate whether the corresponding logical memory block 200a is reserved or not. For example, if the reservation attribute 204a has the boolean value "TRUE", then the corresponding logical memory block 200a may be reserved memory, i.e., the logical memory block 200a cannot be swapped to the secondary storage 102 by the virtual memory manager 114.

The other attributes 206a ... 206n may include other attributes besides reservations attributes, where the other attributes 206a ... 206n define additional characteristics of the logical memory blocks 200a ... 200n. For example, the other attributes 206a may indicate whether the logical memory block 200a includes data that has been modified by a customer.

Therefore, FIG. 2 illustrates embodiments in which the logical memory blocks 200a ... 200n that comprise the memory 106 have corresponding attributes 202a ... 202n. Certain attributes, such as, the reservation attributes 204a ... 204n, may indicate whether the corresponding logical memory block may be swapped from the memory 106 by the virtual memory manager 114.

Figure 3:
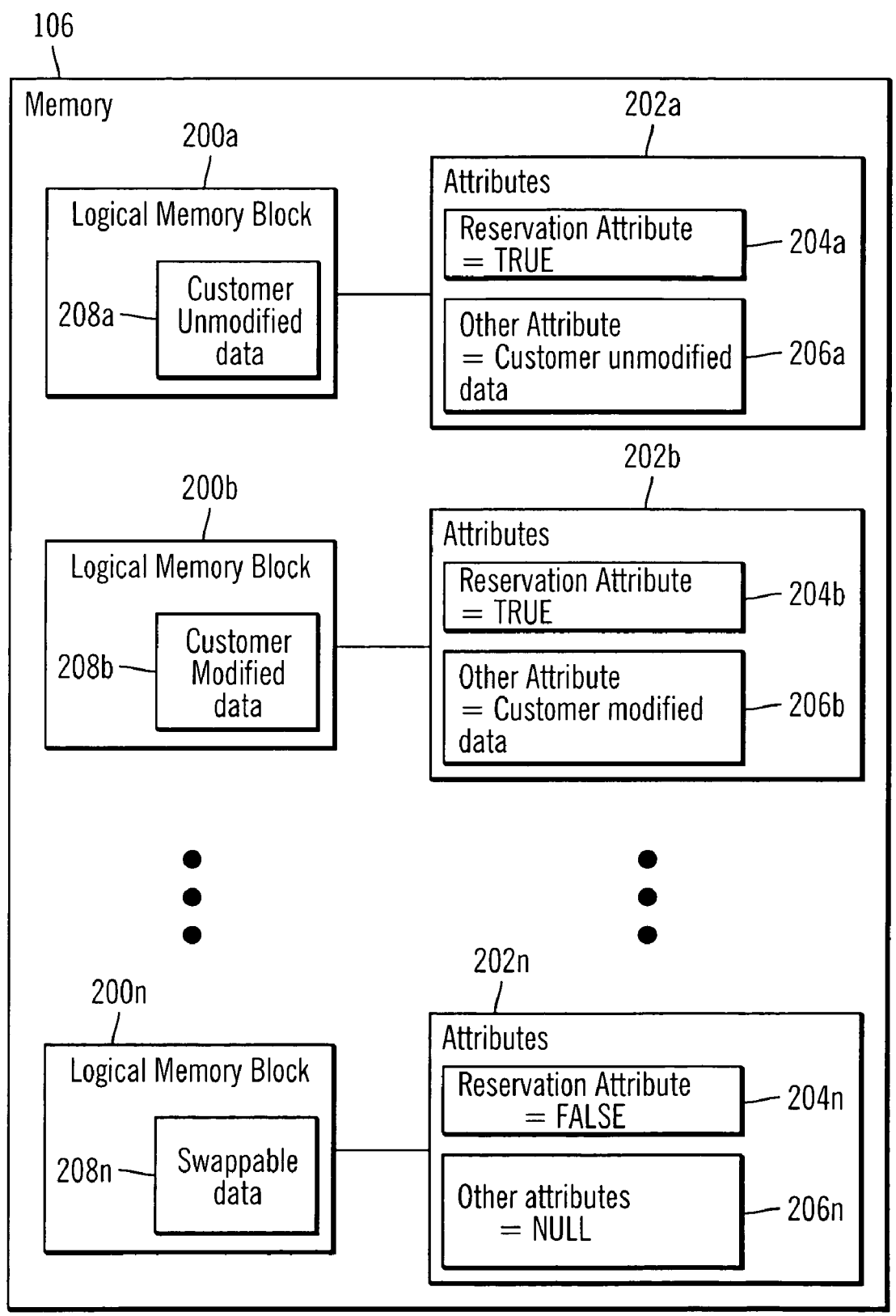
FIG. 3 illustrates a block diagram of exemplary logical memory blocks implemented in the computing environment, in accordance with certain described embodiments of the invention.

FIG. 3 illustrates a block diagram of exemplary logical memory blocks 200a ... 200n and exemplary attributes 202a ... 202n implemented in the computational device 100, in accordance with certain embodiments of the invention.

In certain embodiments, the exemplary logical memory blocks 200a ... 200n may include swappable data, customer unmodified data, and customer modified data. In other embodiments, the logical memory blocks may include data with additional or different characteristics. Swappable data may comprise data that may be swapped from the memory 106 to the secondary storage 102. Customer modified data may comprise data that may have been modified by a customer. Customer unmodified data may comprise data that may not have been modified by a customer. In certain embodiments, where the computational device 100 is a storage controller, the customer data may be written to the computational device 100 by applications running on a host system that is coupled to the computational device 100. For example, the logical memory block 200a may include customer unmodified data 208a, the logical memory block 200b may include customer modified data 208b, and the logical memory block 200n may include swappable data 208n.

The exemplary values for the attributes 202a ... 202n that correspond to the exemplary logical memory blocks 200a ... 200n are also illustrated in FIG. 3. For example, the logical memory block 200a includes customer unmodified data 208a. In certain embodiments, customer data whether modified or unmodified is not swapped to the secondary storage 102 by the virtual memory manager 114. In such embodiments, the corresponding reservation attribute 204a may have a boolean value of "TRUE" and the corresponding other attribute 206a may indicate that the logical memory block 200a contains customer unmodified data.

To provide a further example, the logical memory block 200b includes customer modified data 208b. The corresponding reservation attribute 204b may have a boolean value of "TRUE" and the corresponding other attribute 206a may indicate that the logical memory block contains customer modified data. To provide an additional example, the logical memory block 200n may include swappable data 208n. The corresponding reservation attribute 204n may have a boolean value of "FALSE" and the corresponding other attribute 206a may be "NULL".

Therefore, FIG. 3 describes certain exemplary embodiments where the attributes 202a ... 202n indicate whether logical memory blocks 200a ... 200n are reserved memory. The attributes 202a ... 202n may further indicate additional characteristics that are associated with the logical memory blocks 200a ... 200n.

Figure 4:
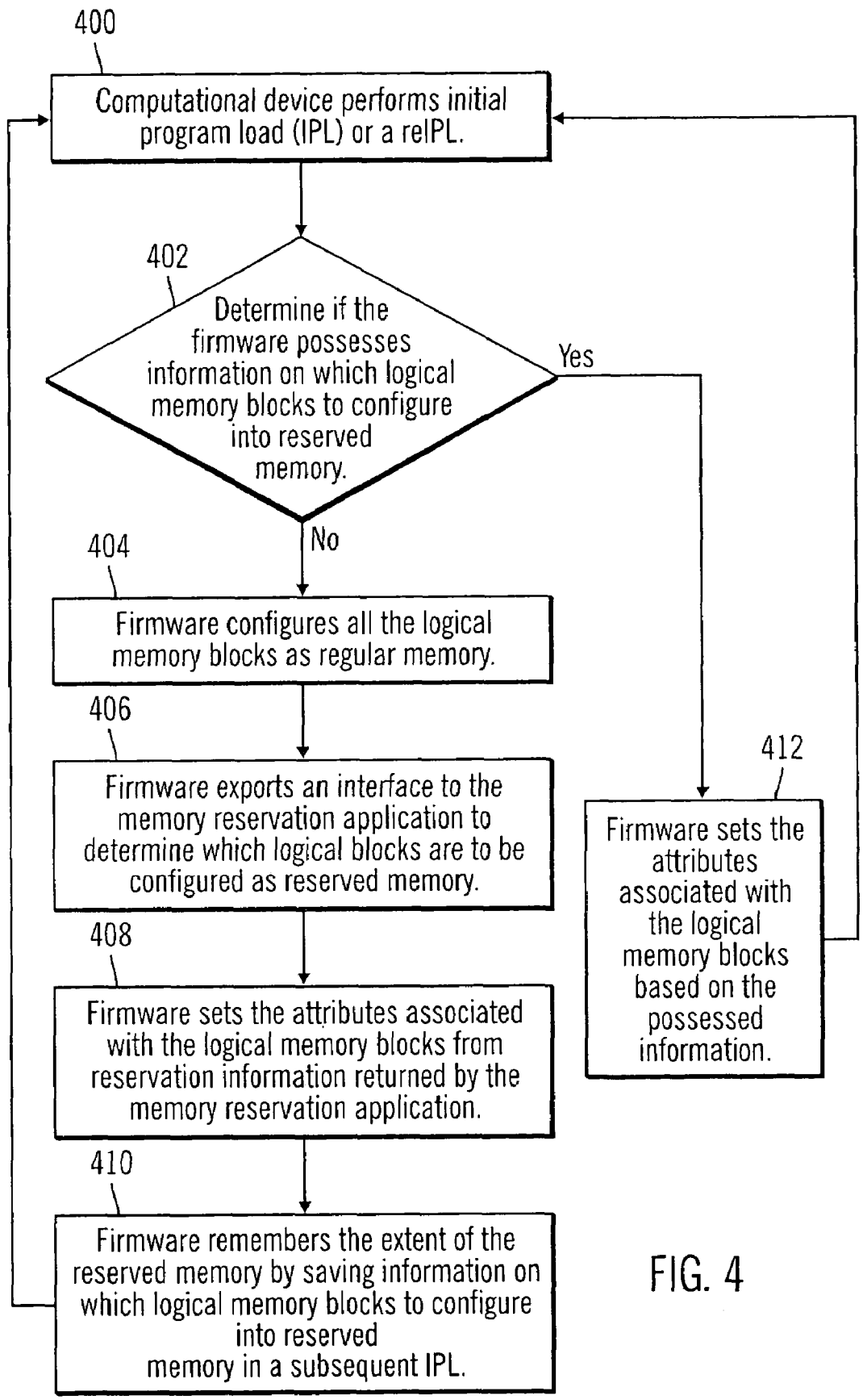
FIG. 4 illustrates logic for reserving memory, in accordance with certain described embodiments of the invention.

FIG. 4 illustrates logic for reserving memory implemented in the computational device 100, in accordance with certain embodiments of the invention.

Control starts at block 400, where the computational device 100 performs an initial program load (IPL) or a reinitialized program load (reIPL) of the computational device 100, where a reIPL is a second or subsequent IPL of the computational device 100. In certain embodiments, in an IPL or a reIPL the computational device 100 may undergo a boot sequence. For example, an IPL or a reIPL process may include testing the memory 106 and loading the operating system 100, device drivers, and other applications resident in the computational device 100.

The firmware 108 determines (at block 402) whether the firmware 108 possesses information on which logical memory blocks 200a . . . 200n in the memory 206 to configure into reserved memory. In certain embodiments, such information may reside in a file that is resident in the computational device 100 or may otherwise have been saved by the firmware 108 from a previous IPL.

If the firmware 108 determines (at block 402) that the firmware 108 does not possess information on which logical memory blocks 200a . . . 200n to configure into reserved memory, then the firmware 108 configures (at block 404) all the logical memory blocks 200a . . . 200n as regular memory, i.e., memory that may be swapped to the secondary storage 102. In certain embodiments, all of the logical memory blocks 200a . . . 200n may in such an instance be referred to as belonging to a regular memory pool. The reservation attributes 204a . . . 204n may be set to the boolean value "FALSE".

The firmware 108 exports (at block 406) an interface to the memory reservation application 112 to determine which logical memory blocks are to be configured as reserved memory. The firmware sets (at block 408) the reservation attributes 204a . . . 204n associated with the logical memory blocks 200a . . . 200n based on information returned by the memory reservation application 112. For example, if the logical memory block 200a is to configured as reserved memory then the reservation attribute 204a may be set to the boolean value "TRUE". The memory reservation application 112 may have returned the information on which logical memory blocks are to be configured as reserved memory from user specified inputs, from stored data in the computational device 100, from policies stored in the computational device 100, etc.

The firmware 108 saves (at block 410) the extent of the reserved memory for a subsequent IPL. Since the firmware 108 possesses the information on which logical memory blocks to configure into reserve memory, the firmware 108 may save the information in any manner known in the art, such as, by storing the information in a file that is read during a subsequent IPL. Control proceeds to block 400 where the computational device 100 performs a reIPL. Therefore, the extent of the reserved memory may be persistent across repeated IPLs of the computational device.

If the firmware 108 determines (at block 402) that the firmware 108 possesses information on which logical memory blocks 200a . . . 200n to configure into reserved memory then the firmware 108 sets (at block 412) the reservation attributes 204a . . . 204n corresponding to the logical memory blocks 200a . . . 200n based on the possessed information and returns control to block 400, where the computational device 100 performs a reIPL.

Figure 5:
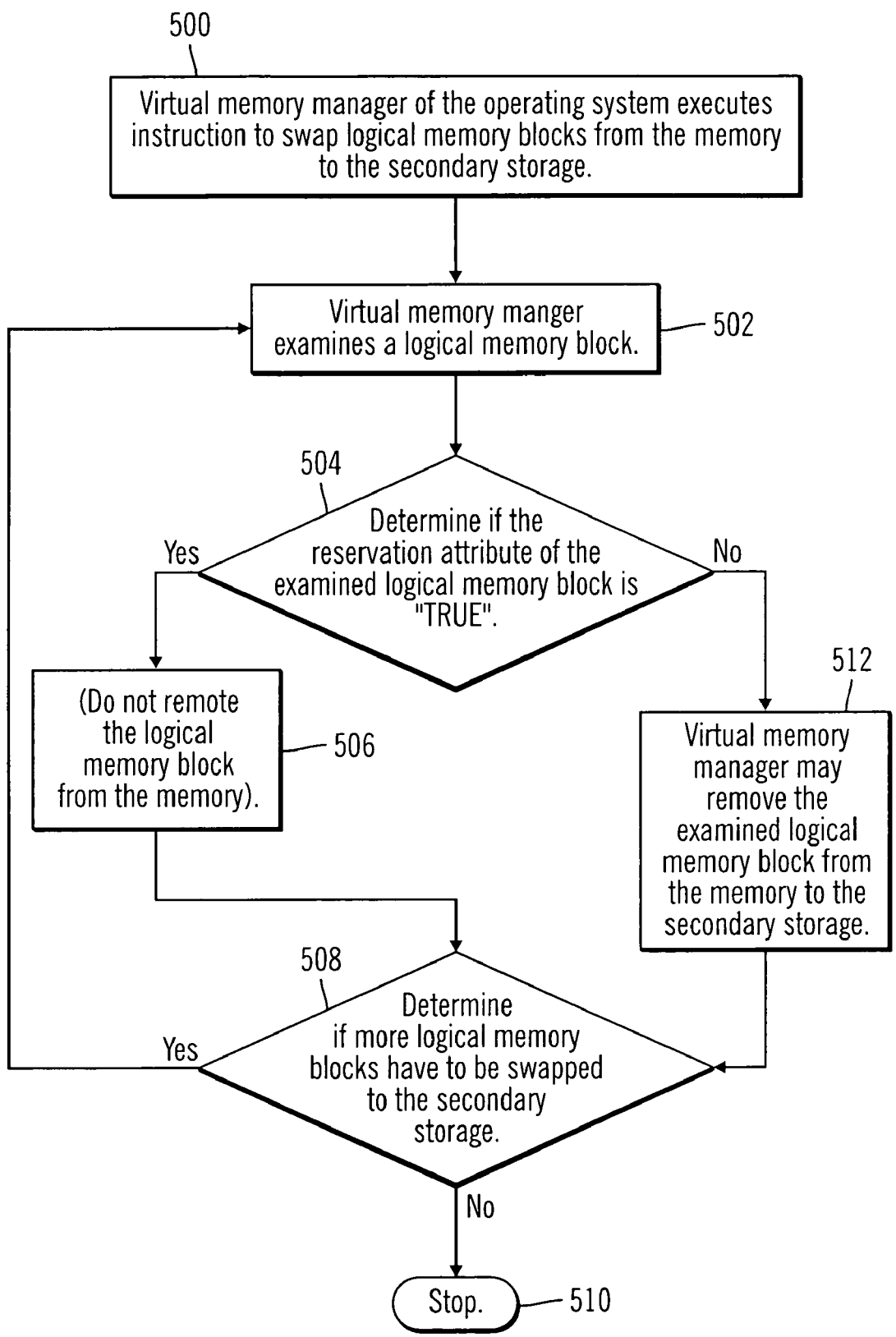
FIG. 5 illustrates logic for swapping from memory to secondary storage, in accordance with certain described embodiments of the invention.

Therefore, FIG. 5 illustrates certain embodiments where the firmware 108 performs a reservation of the memory 106, such that the reserved memory cannot be swapped to the secondary storage 102. In certain embodiments, the contents of a logical memory block are kept in contiguous physical blocks, i.e., the actual data contents of a logical memory block are kept in contiguous physical storage in the memory 106. If the actual data contents of a logical memory block are kept in contiguous physical storage in the memory 106, then the actual data contents of the logical memory block may be accessed faster when compared to the access time of the actual data contents if the actual data contents of the logical memory blocks were not kept in contiguous physical storage.

By implementing the embodiments in firmware, and in certain embodiments by performing the memory reservation at IPL, the limits on memory reservation that may exist in an operating system may be bypassed. For example, even if an operating system 110 sets an upper limit of 80% on the amount of reserved memory when compared to the total memory, the embodiments can allow the reserved memory to exceed the upper limit of 80% imposed by the operating system 110.

FIG. 5 illustrates logic for swapping logical memory blocks 200a . . . 200n to the secondary storage 102, in accordance with certain embodiments of the invention. The logic may be implemented in the computational device 100.

Control starts at block 500, where the virtual memory manager 114 of the operating system 110 executes an instruction to swap logical memory blocks from the memory 106 to secondary storage 102.

The virtual memory manager 114 examines (at block 502) a logical block and determines (at block 504) if the reservation attribute 204a . . . 204n that corresponds to the examined logical block has the boolean value "TRUE". If so, the virtual memory manager 114 does not remove the examined memory block from the memory 106 to the secondary storage 102 (at block 506).

The virtual memory manager 114 determines (at block 608) if more logical memory blocks have to be swapped to the secondary storage 102. If so, the virtual memory manager 114 examines (at block 502) the next logical memory block. If not, the process stops (at block 510).

If the virtual memory manager 114 determines (at block 504) that the reservation attribute 204a . . . 204n of the examined logical block is not the boolean value "TRUE", then the virtual memory manager 114 may remove (at block 512), i.e., swap, the examined logical memory block from the memory 106 to the secondary storage 102. The virtual memory manager 114 determines (at block 508) if additional logical memory blocks have to be swapped to the secondary storage 102.

Therefore, FIG. 5 illustrates certain embodiments, where the virtual memory manager 114 may page only memory that has not been reserved to the secondary storage 102. Additionally, the virtual memory manager 114 may also provide address translation on both the memory that has been reserved and memory that has not been reserved.

Figure 6:
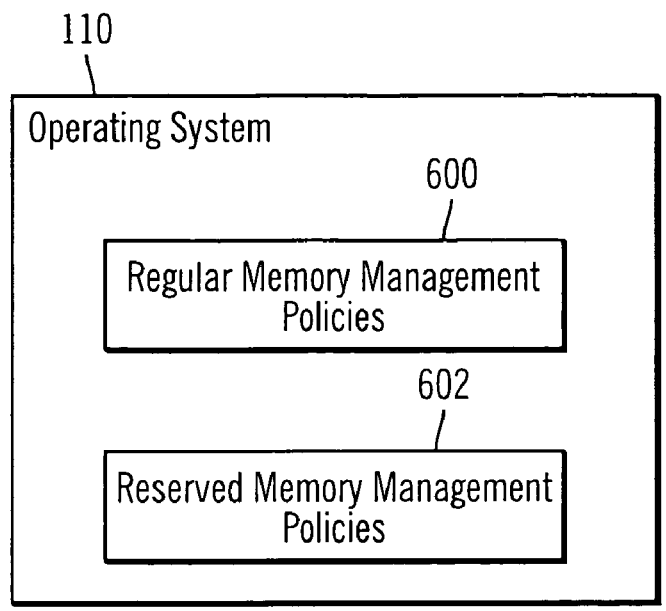
FIG. 6 illustrates a block diagram of memory management policies implemented in the computing environment, in accordance with certain described embodiments of the invention.

FIG. 6 illustrates a block diagram of memory management policies implemented by the operating system 110, in accordance with certain embodiments of the invention. In certain embodiments, the operating system 110 may have regular memory management policies 600 to manage memory that has not been reserved, and reserved memory management policies 602 to manage memory that has been reserved.

For example, exemplary regular memory management policies 600 may include periodic garbage collection, whereas exemplary reserved memory management policies 602 may in certain embodiments may include no provisions for periodic garbage collection.

Figure 7:
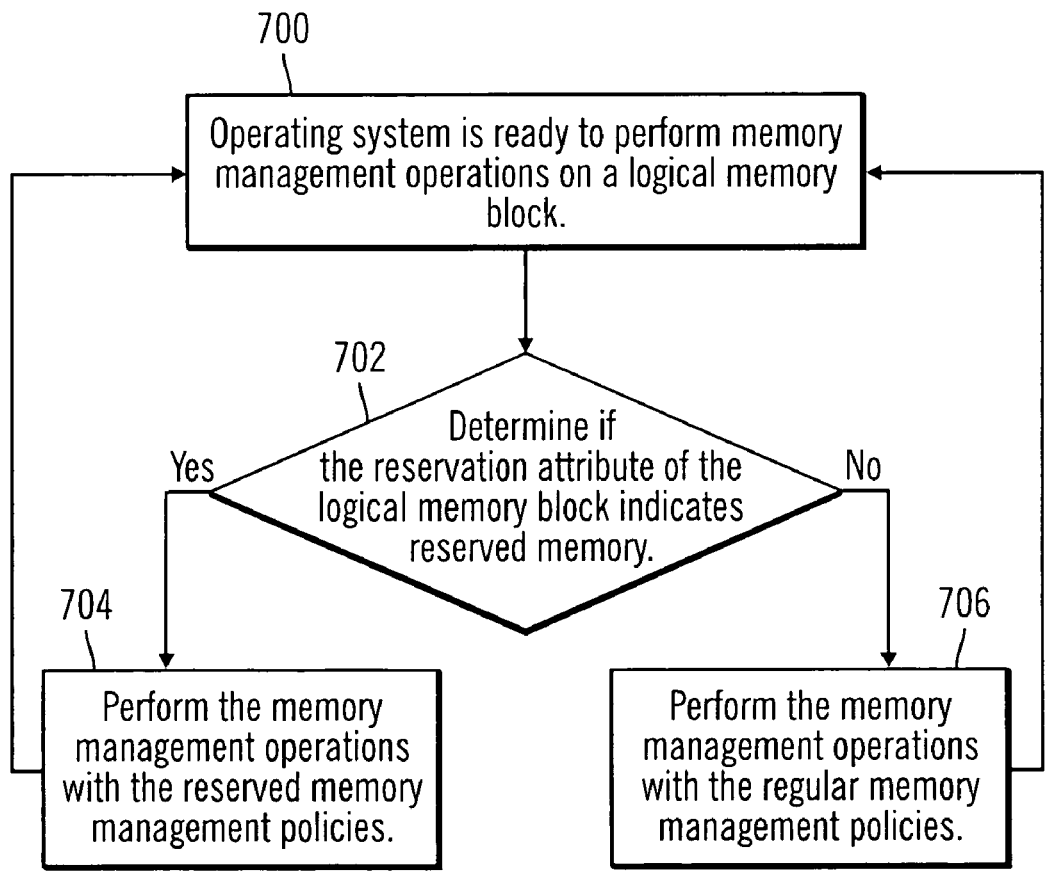
FIG. 7 illustrates logic for applying memory management policies, in accordance with certain described embodiments of the invention.

FIG. 7 illustrates logic for applying the memory management policies 600, 602 in accordance with certain embodiments of the invention.

Control starts at block 700, where the operating system 110 is ready to perform memory management operations on a logical memory block 200a . . . 200n. The operating system 110 determines (at block 702) if the corresponding reservation attribute 204a . . . 204n of the logical memory block 200a . . . 200n indicates that the logical memory block 200a . . . 200n is a reserved memory block. If so, the operating system 110 performs (at block 704) the memory management operations with the reserved memory management policies 600. If not, the operating system 110 performs (at block 706) the memory management operations with the regular memory management policies. In certain additional embodiments, the other attributes 206a . . . 206n may also be used to determine specific memory management policies.

Therefore, FIGS. 6 and 7 illustrate certain embodiments where different memory management policies may be applied to a logical memory block 200a . . . 200n based on whether the logical memory block 200a . . . 200n is reserved memory or memory that is not reserved.

The embodiments provide a reservation attribute 204a . . . 204n for each logical memory block 200a . . . 200n to indicate that the logical memory block is reserved and may not be allowed to be paged to the secondary storage 102. In certain embodiments, the operating system 110 may divide the logical memory blocks 200a . . . 200n in the memory 106 into a regular pool and a reserved pool. The virtual memory manager 114 of the operating system 110 may provide address translation on both the regular pool and the reserved pool. However, the virtual memory manager 114 may page only the memory from the regular pool to the secondary storage 102.

In certain embodiments, the reserved memory may be used to buffer customer data, such that, the virtual memory manager does not page the customer data to secondary storage. The embodiments may not require any modification to the existing memory reservation scheme of an operating system. However, if there is a limit on the amount of memory that may be allowed to be reserved by the operating system, the embodiments may allow applications to exceed that limit.

Some of the embodiments may allow the operating system 110 to apply different management policies on the reserved memory when compared to the memory that is not reserved. Certain embodiments may also allow the operating system 110 to provide a standard translation for other applications to access the reserved memory. Certain embodiments may further implement the reserved memory as a contiguous physical block for quicker address translation. The reserved memory may not be paged into secondary storage and the address translation of the reserved memory may be static. In certain embodiments, applications may calculate the address translation without querying associated page table entries. Additionally, the extent and identity of the reserved memory may be persistent across repeated IPLs of the computational device 100.

ADDITIONAL IMPLEMENTATION DETAILS

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Figure 8:
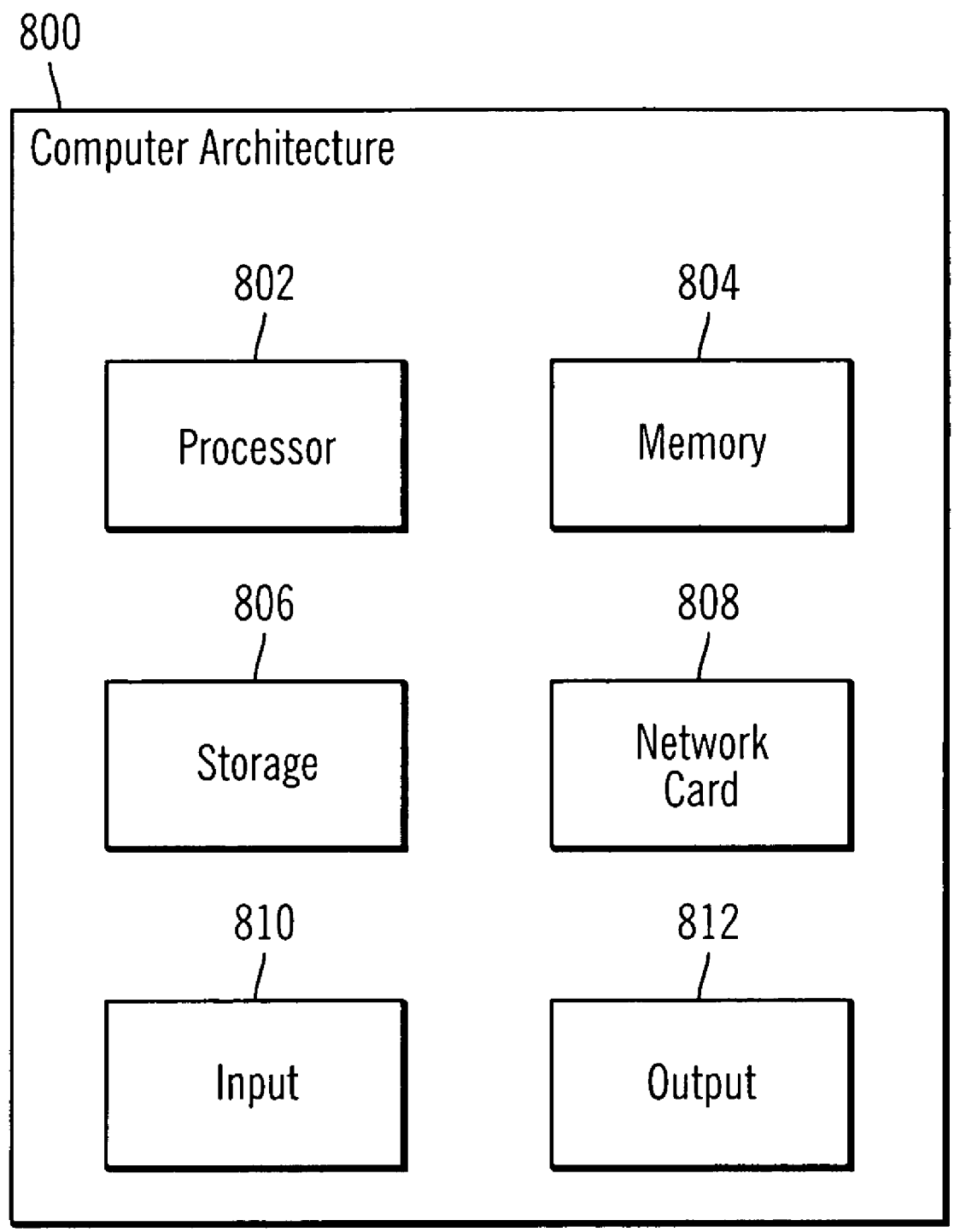
FIG. 8 illustrates a block diagram of a computer architecture in which certain described aspects of the invention are implemented.

FIG. 8 illustrates a block diagram of a computer architecture in which certain aspects of the invention are implemented. FIG. 8 illustrates one implementation of the computational device 100. The computational device 100 may implement a computer architecture 800 having a processor 802 (e.g., CPU 104), a memory 804 (e.g., a volatile memory device, such as, memory 106), and storage 806 (e.g., a non-volatile storage, magnetic disk drives, optical disk drives, tape drives, etc.). In certain embodiments the storage 806 may include the secondary storage 102. The storage 806 may comprise an internal storage device, an attached storage device or a network accessible storage device. Programs in the storage 806 may be loaded into the memory 804 and executed by the processor 802 in a manner known in the art. The architecture may further include a network card 808 to enable communication with a network. The architecture may also include at least one input 810, such as a keyboard, a touchscreen, a pen, voice-activated input, etc., and at least one output 812, such as a display device, a speaker, a printer, etc.

The logic of FIGS. 4, 5, and 7 describes specific operations occurring in a particular order. Further, the operations may be performed in parallel as well as sequentially. In alternative embodiments, certain of the logic operations may be performed in a different order, modified or removed and still implement embodiments of the present invention. Morever, steps may be added to the above described logic and still conform to the embodiments. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

allocating a plurality of logical memory blocks corresponding to a memory in a computational device;

associating an attribute with at least one logical memory block, wherein the attribute indicates whether the at least one logical memory block can be swapped from the memory, and wherein physical blocks corresponding to the at least one logical memory block are contiguous, wherein allocating the plurality of logical memory blocks and associating the attribute are performed during a reinitialized program load by a firmware in the computational device, wherein the computational device includes an operating system that has a limit on an amount of memory that can be reserved for swapping from the memory, wherein allocating the plurality of logical memory blocks and associating the attribute allow an application to exceed the limit on the amount of memory that can be reserved, and wherein allocating the plurality of logical memory blocks and associating the attribute further comprise:

(i) determining if the firmware in the computational device possesses information on which of the plurality of logical memory blocks to configure into reserved logical memory blocks, wherein the information has been saved by the firmware from an initialized program load that has been performed prior to the reinitialized program load; and (ii) setting the attribute associated with the at least one logical memory block based on the possessed information, in response to determining that the firmware in the computational device possesses information on which of the plurality of logical memory blocks to configure into the reserved logical memory blocks, wherein the attribute if set indicates that the at least one logical memory block cannot be swapped from the memory and that the at least one logical memory block is a reserved logical memory block; and associating an additional attribute with the at least one logical memory block, wherein the additional attribute further characterizes properties of the at least one logical memory block, and wherein the additional attribute indicates whether or not customer modified data is present in the at least one logical block.

2. The method of claim 1, wherein allocating the plurality of logical memory blocks and associating the attribute further comprise:

determining if the firmware in the computational device possesses information on which of the plurality of logical memory blocks to configure into reserved logical memory blocks;

determining, by the firmware, in association with a memory reservation application which of the plurality of logical memory blocks to configure into reserved logical memory blocks, in response to determining that the firmware in the computational device does not possess information on which of the plurality of logical memory blocks to configure into reserved logical memory blocks; and saving, by the firmware, which of the plurality of logical memory blocks to configure into reserved memory blocks across initial program loads of the computational device.

3. The method of claim 1, further comprising:

associating an additional attribute with the at least one logical memory block, wherein the additional attribute indicates whether data in the at least one logical memory block is modifiable.

4. The method of claim 1, further comprising:

executing, by a virtual memory manager, an instruction to swap the at least one logical memory block to a secondary storage coupled to the computational device;

determining, by the virtual memory manager, whether the associated attribute of the at least one logical memory block indicates that the logical memory block cannot be swapped from the memory; and swapping the at least one logical memory block to the secondary storage from the memory, in response to determining that the associated attribute of the at least one logical memory block does not indicate that the logical memory block cannot be swapped from the memory.

5. The method of claim 1, further comprising:

maintaining a first memory management policy for reserved logical memory blocks;

maintaining a second memory management policy for unreserved logical memory blocks;

determining if the at least one memory block is a reserved logical memory block; and performing a memory management operation on the at least one logical memory block based on the first memory management policy, in response to determining that the at least one memory block is a reserved logical memory block.

6. The method of claim 1, wherein allocating the plurality of logical memory blocks and associating the attribute are performed by an application in the computational device, and wherein the application is different from an operating system in the computational device.

7. The method of claim 1, further comprising:

performing a static address translation for the at least one logical memory block, if the at least one logical memory block cannot be swapped from the memory.

8. The method of claim 1, wherein the information has been saved in a file that is resident on the computational device.

9. A system, comprising:

a computational device;

a memory coupled to the computational device;

means for allocating a plurality of logical memory blocks corresponding to the memory in the computational device;

means for associating an attribute with at least one logical memory block, wherein the attribute indicates whether the at least one logical memory block can be swapped from the memory, and wherein physical blocks corresponding to the at least one logical memory block are contiguous;

an application implemented in the computational device;

an operating system coupled to the computational device, wherein the operating system has a limit on an amount of memory that can be reserved for swapping from the memory;

a firmware in the computational device, wherein allocating the plurality of logical memory blocks and associating the attribute are implemented in the firmware and are performed during a reinitialized program load by the firmware, wherein the means for allocating the plurality of logical memory blocks and the means for associating the attribute allow the application to exceed the limit on the amount of memory that can be reserved, and wherein the means for allocating the plurality of logical memory blocks and the means for associating the attribute further perform:
  (i) determining if the firmware possesses information on which of the plurality of logical memory blocks to configure into reserved logical memory blocks, wherein the information has been saved by the firmware from an initialized program load that has been performed prior to the reinitialized program load; and
  (ii) setting the attribute associated with the at least one logical memory block based on the possessed information, in response to determining that the firmware possesses information on which of the plurality of logical memory blocks to configure into reserved logical memory blocks, wherein the attribute if set indicates that the at least one logical memory block cannot be swapped from the memory and that the at least one logical memory block is a reserved logical memory block; and
means for associating an additional attribute with the at least one logical memory block, wherein the additional attribute further characterizes properties of the at least one logical memory block, and wherein the additional attribute indicates whether or not customer modified data is present in the at least one logical block.

10. The system of claim 9, further comprising:
a memory reservation application implemented in the computational device wherein the means for allocating the plurality of logical memory blocks and the means for associating the attribute further perform:
  (i) determining if the firmware possesses information on which of the plurality of logical memory blocks to configure into reserved logical memory blocks; and
  (ii) determining, by the firmware, in association with the memory reservation application which of the plurality of logical memory blocks to configure into reserved logical memory blocks, in response to determining that the firmware in the computational device does not possess information on which of the plurality of logical memory blocks to configure into reserved logical memory blocks; and
  (iii) saving, by the firmware, which of the plurality of logical memory blocks to configure into reserved memory blocks across initial program loads of the computational device.

11. The system of claim 9, further comprising:
means for associating an additional attribute with the at least one logical memory block, wherein the additional attribute indicates whether data in the at least one logical memory block is modifiable.

12. The system of claim 9, further comprising:
a virtual memory manager coupled to the computational device;
a secondary storage coupled to the computational device;
means for executing, by the virtual memory manager, an instruction to swap the at least one logical memory block to the secondary storage coupled to the computational device;
means for determining, by the virtual memory manager, whether the associated attribute of the at least one logical memory block indicates that the logical memory block cannot be swapped from the memory; and
means for swapping the at least one logical memory block to the secondary storage from the memory, in response to determining that the associated attribute of the at least one logical memory block does not indicate that the logical memory block cannot be swapped from the memory.

13. The system of claim 9, further comprising:
a first memory management policy for reserved logical memory blocks;
a second memory management policy for unreserved logical memory blocks;
means for maintaining the first memory management policy for reserved logical memory blocks;
means for maintaining the second memory management policy for unreserved logical memory blocks;
means for determining if the at least one memory block is a reserved logical memory block; and
means for performing a memory management operation on the at least one logical memory block based on the first memory management policy, in response to determining that the at least one memory block is a reserved logical memory block.

14. The system of claim 9, further comprising:
an operating system coupled to the computational device; and
an application implemented in the computational device, wherein the means for allocating the plurality of logical memory blocks and the means for associating the attribute are performed by the application, and wherein the application is different from the operating system.

15. The system of claim 9, further comprising:
means for performing a static address translation for the at least one logical memory.

16. The system of claim 9, wherein the information has been saved in a file that is resident on the computational device. block, if the at least one logical memory block cannot be swapped from the memory.

17. A computer readable storage medium including code, wherein the code in response to being executed by a computer is capable of causing operations, the operations comprising:
allocating a plurality of logical memory blocks corresponding to a memory in a computational device;
associating an attribute with at least one logical memory block, wherein the attribute indicates whether the at least one logical memory block can be swapped from the memory, and wherein physical blocks corresponding to the at least one logical memory block are contiguous, wherein allocating the plurality of logical memory blocks and associating the attribute are performed by a firmware during a reinitialized program load in the computational device, wherein the computational device includes an operating system that has a limit on an amount of memory that can be reserved for swapping from the memory, wherein allocating the plurality of logical memory blocks and associating the attribute allow an application to exceed the limit on the amount of memory that can be reserved, and wherein allocating the plurality of logical memory blocks and associating the attribute further comprise:
  (i) determining if the firmware in the computational device possesses information on which of the plurality of logical memory blocks to configure into reserved logical memory blocks, wherein the information has been saved by the firmware from an initialized program load that has been performed prior to the reinitialized program load; and
  (ii) setting the attribute associated with the at least one logical memory block based on the possessed information, in response to determining that the firmware in the computational device possesses information on which of the plurality of logical memory blocks to configure into reserved logical memory blocks, wherein the attribute if set indicates that the at least one logical memory block cannot be swapped from the memory and that the at least one logical memory block is a reserved logical memory block; and associating an additional attribute with the at least one logical memory block, wherein the additional attribute further characterizes properties of the at least one logical memory block, and wherein the additional attribute indicates whether or not customer modified data is present in the at least one logical block.

18. The computer readable storage medium of claim 17, wherein allocating the plurality of logical memory blocks and associating the attribute further comprise:

determining if the firmware in the computational device possesses information on which of the plurality of logical memory blocks to configure into reserved logical memory blocks;

determining, by the firmware, in association with a memory reservation application which of the plurality of logical memory blocks to configure into reserved logical memory blocks, in response to determining that the firmware in the computational device does not possess information on which of the plurality of logical memory blocks to configure into reserved logical memory blocks; and saving, by the firmware, which of the plurality of logical memory blocks to configure into reserved memory blocks across initial program loads of the computational device.

19. The computer readable storage medium of claim 17, the operations further comprising:

associating an additional attribute with the at least one logical memory block, wherein the additional attribute indicates whether data in the at least one logical memory block is modifiable.

20. The computer readable storage medium of claim 17, the operations further comprising:

executing, by a virtual memory manager, an instruction to swap the at least one logical memory block to a secondary storage coupled to the computational device;

determining, by the virtual memory manager, whether the associated attribute of the at least one logical memory block indicates that the logical memory block cannot be swapped from the memory; and swapping the at least one logical memory block to the secondary storage from the memory, in response to determining that the associated attribute of the at least one logical memory block does not indicate that the logical memory block cannot be swapped from the memory.

21. The computer readable storage medium of claim 17, the operations further comprising:

maintaining a first memory management policy for reserved logical memory blocks;

maintaining a second memory management policy for unreserved logical memory blocks;

determining if the at least one memory block is a reserved logical memory block; and performing a memory management operation on the at least one logical memory block based on the first memory management policy, in response to determining that the at least one memory block is a reserved logical memory block.

22. The computer readable storage medium of claim 17, wherein allocating the plurality of logical memory blocks and associating the attribute are performed by an application in the computational device, and wherein the application is different from an operating system in the computational device.

23. The computer readable storage medium of claim 17, the operations further comprising:

performing a static address translation for the at least one logical memory block, if the at least one logical memory block cannot be swapped from the memory.

24. The computer readable storage medium of claim 17, wherein the information has been saved in a file that is resident on the computational device.

* * * * *